S. C. SLADDEN.
TIRE VALVE.
APPLICATION FILED SEPT. 15, 1917.
1,267,600.
Patented May 28, 1918.
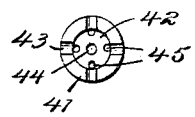
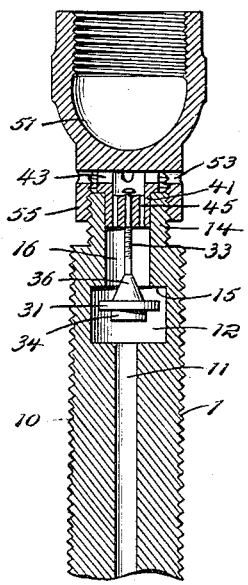
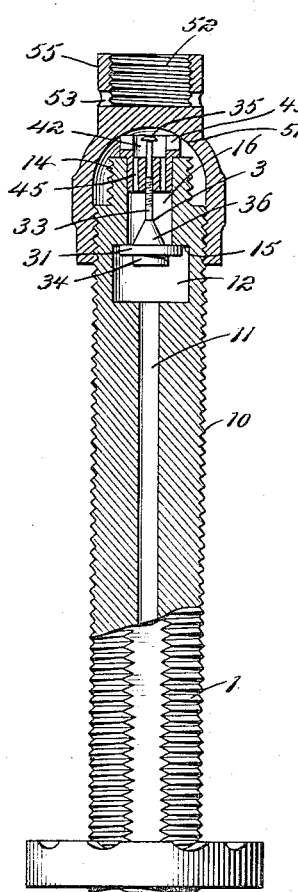
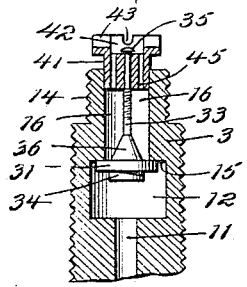
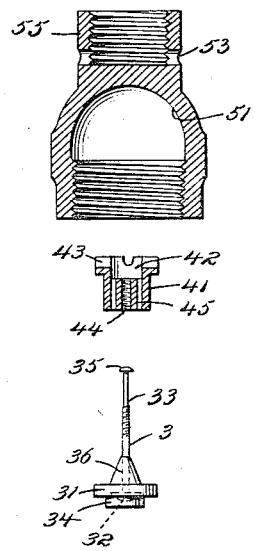
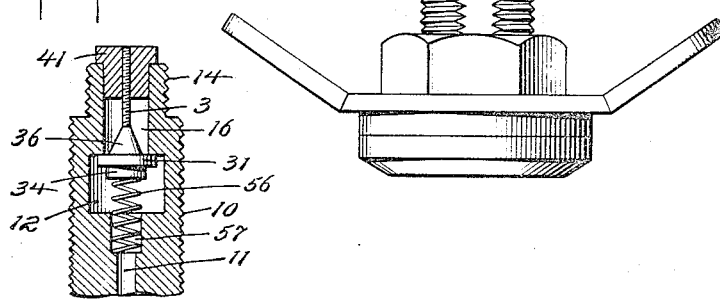

UNITED STATES PATENT OFFICE.

SIDNEY C. SLADDEN, OF NEW YORK, N. Y.

TIRE-VALVE.

1,267,600.  Specification of Letters Patent.  Patented May 28, 1918.

Application filed September 15, 1917. Serial No. 191,534.

*To all whom it may concern:*

Be it known that I, SIDNEY C. SLADDEN, a citizen of the United States, and a resident of the city of New York, borough of Manhattan, in the county and State of New York, have invented a new and Improved Tire-Valve, of which the following is a full, clear, and exact description.

Among the principal objects which the present invention has in view are: To decrease the time factor incident to inflation and deflation of tires or the pneumatic tubes thereof; to cheapen the cost of construction of valves of the character mentioned; to simplify the construction to permit the rapid removal or renewal of parts of said valve; to retain the air more securely within the said tubes and for a longer period of time; to mechanically seat and hold the valve closed, on the inside, solely by external means and independent of air pressure from the inflated tube.

In the accompanying drawings:

Figure 1 is a sectional elevation of a valve of the character mentioned, constructed and arranged in accordance with the present invention, showing it in a closed, service and locked position.

Fig. 2 is a vertical sectional view showing the valve in closed position but unlocked.

Fig. 3 is a vertical sectional view of the valve construction, showing the release cap in service position, and the valve in an open position for deflating the tube.

Fig. 4 is a vertical sectional view of the coöperative valve elements shown in alined spread relation.

Fig. 5 is a horizontal view of the upper part of the valve stem nut, showing the central hole, for the valve stem, and the surrounding air passages.

Fig. 6 is a modified form of the invention, showing it in service position.

As seen in the drawings, the valve casing 1 is provided with a diminished passage 11, an enlarged chamber 12, and a neck 14, through which is a passage 16.

The valve 3, forms the closure member for passage 16, and when the said valve is lifted and forced by the air pressure in the pneumatic tube, or by the nut 41, the flap of the gasket rests on seat 15.

The gasket of said valve is preferably constructed of some flexible material, such as rubber. The valve stem 33 is constructed of metal and has a flattened head 32, at the lower end with a diameter slightly smaller than the passage 16. At the upper end of said valve stem 33, is a head 35, to prevent said stem slipping through passage 44, in nut 41, when out of service position. For a short distance below upper head 35, the valve stem 33 is smooth and readily slips through passage 44, to give valve stem 33 free play, when out of service position. The valve stem 33 is threaded adjacent to the exposed end.

The lower or solid part of the gasket is flexible, but is reinforced by valve stem head 32, to keep it in its proper shape and from being forced through passage 16. The flange 31 is located on the central part of the rubber gasket, and is of reduced thickness, so that it is collapsible by a light downward pressure, but it will resume its normal shape upon being released, when it reaches chamber 12, in casing 1.

The upper part of the gasket consists of a conical or other shaped body of rubber 36, or other flexible substance, surrounding the valve stem 33, as an extra means to prevent head 32 from being separated from the gasket, and to center the gasket in and around passage 16. Parts 31, 34 and 36, are preferably molded around valve stem 33 and head 32, at one and the same time. It is understood the valve stem 33 is extended through or into said gasket, and the two parts are rigidly held together.

The flap 31 being pliable, is readily forced through the air passage 16. The said flap 31 being flat upon the upper surface, will cover passage 16, and part of surface of the surrounding upper wall 15, and forms the closure member.

It will be noticed that the walls of passage 12 are sufficiently distant from the gasket, when the valve is in open position, to allow the air to freely pass around the outside of the gasket.

The upper neck 14 of casing 1, is reduced in diameter, and threaded to engage threads on the prevailing styles of air pumps, pressure gages, and also the release cap 55.

The valve stem nut 11 is constructed of metal, the lower part being small enough to fit into passage 16, in the upper part of neck 14. The upper part of nut 41 is enlarged and rests upon the top of neck 14. Through the center of nut 41, is bored a hole 44, which is threaded to register with the threads on valve stem 33. There are several passages 45, surrounding hole 44, through which the air is allowed to freely pass, during inflation or deflation.

Nut 41 is preferably constructed with a recess 42, in the upper part, for the purpose of allowing valve stem 33 to have a slight vertical play for inflation and deflation. When lock cap 51 is in service position, it presses only upon the outer top edge of nut 41, and protects stem 33, from an external pressure.

When the valve is seated by air pressure from tube, but unlocked by nut 41, the said nut is held slightly above neck 14 by the valve stem 33, as seen in Fig. 2. By a slight pressure and twist on nut 41, the threads on said nut will engage the threads on valve stem 33, and the valve 3 will be forcefully seated.

The flange 31, and portion 34, reinforced by head 32, prevent blowing the gasket out through passage 16. An additional preventive means is provided by the nut 41, which engages the lock cap 51.

The gasket is prevented from seating upon the top of passage 11, when in open position or during inflation, by head 35 resting upon and across passage 44, in nut 41.

The lower inside part of lock cap 51, is threaded to register with the threads on the outside of casing 1. When lock cap 51 is tightly screwed down, it acts as a lock nut for nut 41. The upper part of the inside of lock cap 51 is dome shaped, and only hits the outer and upper edge of nut 41, and will not hit any part of valve stem 33. The principal function of lock cap 51, is to act as a lock nut to valve stem nut 41, to prevent said nut from unscrewing and releasing valve 3. This lock nut construction is very essential to the success of holding the valve stem nut 41, in service position, as said nut is only tightened by the fingers and depends upon the lock cap 51, to hold it firmly in its service position. The lock cap 51 is tightly screwed down by pliers or wrench.

The release cap 55 is located at the upper end of lock cap 51 and has an opening the same size and threaded similarly to neck 14. When you desire to deflate the tube, unscrew nut 41, and screw the top of release cap 55 to the neck 14. When the cap 55 hits nut 41 it will depress valve stem 33, and immediately unseat the rubber gasket. This will allow the air to pass up to cap 55, through the grooves 43, in the upper part of nut 41. Air will freely pass through the port holes 53, in cap 55, without any other aid and the tube will be quickly deflated.

The assembling of the parts is easily and quickly accomplished, by pressing valve 3 into place, by means of valve stem 33, through passage 16; screwing nut 41 onto top of valve stem 33, and screwing lock cap 51 onto threads 10. By lightly screwing nut 41 onto valve stem 33, it forcefully seats the rubber gasket against the upper wall of chamber 12, and entirely closes passage 16. This mechanical seating force, applied externally, is in addition to the air pressure, which comes from the inflated tube through passage 11, and which will, under ordinary conditions seat said valve. It will be noted that springs of any description are unnecessary to seat the valve, in the described construction.

When it is desired to inflate or add more air to the pneumatic tube, nut 41 is unscrewed on valve stem 33, the air pump is attached to neck 14, and the inrush of air through the holes 45, depresses valve 3, and the air readily passes around flap 31. When the pump is removed from neck 14, the outrush of air forces the gasket against the upper wall of chamber 12, and prevents the air from passing through passage 16.

By means of the powerful leverage of the screw threads in nut 41, valve stem 33 is further drawn upward, and seats the gasket more tightly, than the air pressure is capable of doing. The gasket can be manually closed, and does not have to depend upon air pressure. Valve stem 33 is also centered by nut 41, for inflation, deflation, air gages and pumping purposes. Nut 41 also holds the valve 3 in positive service position, irrespective of the centrifugal force of the wheel in motion, jars from rough roads, vibration, and the deterioration or devitalization of rubber.

From the foregoing, it will be seen that the present construction has no wearing parts or delicate members, liable to destruction or disarrangement, or failure in the performance of the functions for which they were designed.

What I claim is:

1. A valve as characterized comprising a valve casing, having an air inlet and an enlarged passage formed therein, and a valve seat adjacent the upper end of said enlarged passage; a gasket having an upwardly tapered body and an annular flange for engaging said seat, said flange being adapted to collapse upwardly on said body, to permit the insertion of said gasket inwardly through said inlet passage, to aline with said valve seat; and means manually operable for forcefully seating said flange on said seat.

2. A valve as characterized comprising a valve casing, having an air inlet and an enlarged passage formed therein, and a valve seat adjacent the upper end of said enlarged passage; a gasket having an upwardly tapered body and an annular flange for engaging said seat, said flange being adapted to collapse upwardly on said body, to permit the insertion of said gasket inwardly through said inlet passage, to aline with said valve seat; a screw threaded stem for manipulating said gasket, said stem being rigidly connected with said gasket and extending into said inlet passage; and means operatively engaging said stem for forcefully drawing said flange on said valve seat.

3. A valve as characterized comprising a valve casing, having an air inlet and an enlarged passage formed therein, and a valve seat adjacent the upper end of said enlarged passage; a gasket having an upwardly tapered body and an annular flange for engaging said seat, said flange being adapted to collapse upwardly on said body, to permit the insertion of said gasket inwardly through said inlet passage, to aline with said valve seat; and means embodying screw threads formed at the exposed end of said stem and a nut engaging said threads to rest, in service, on the end of said casing.

4. A valve as characterized comprising a valve casing, having an air inlet and an enlarged passage formed therein, and a valve seat adjacent the upper end of said enlarged passage; a gasket having an upwardly tapered body and an annular flange for engaging said seat, said flange being adapted to collapse upwardly on said body, to permit the insertion of said gasket inwardly through said inlet passage, to aline with said valve seat; a nut hermetically closing said passage for preventing accidental blowing of said gasket through said passage.

SIDNEY C. SLADDEN.

Witnesses:
R. J. FAUST, Jr.,
PHILIP F. DONOHUE.